United States Patent [19]

Sears

[11] 4,392,023

[45] Jul. 5, 1983

[54] OFF-HOOK TELEPHONE SENSING SYSTEM

[75] Inventor: Michael L. Sears, Redondo Beach, Calif.

[73] Assignee: Transaction Technology, Inc., Santa Monica, Calif.

[21] Appl. No.: 207,660

[22] Filed: Nov. 17, 1980

[51] Int. Cl.³ .......................................... H04M 11/00
[52] U.S. Cl. ............................. 179/2 DP; 179/18 AB
[58] Field of Search ............ 179/2 DP, 18 AB, 90 B, 179/90 BB, 90 BD, 175.2 C, 2 A, 2 AM

[56] References Cited

U.S. PATENT DOCUMENTS

| | | | |
|---|---|---|---|
| 4,224,478 | 9/1980 | Fahey et al. ................. | 179/2 DP X |
| 4,306,116 | 12/1981 | McClure et al. ............... | 179/2 DP |
| 4,321,429 | 3/1982 | Takatsuki et al. .............. | 179/2 DP |

*Primary Examiner*—G. Z. Rubinson
*Assistant Examiner*—W. J. Brady
*Attorney, Agent, or Firm*—Charles H. Schwartz; Ellsworth R. Roston

[57] ABSTRACT

An off hook telephone sensing system for use with a voice and data transmission system, including a transaction terminal coupled to a telephone line for data transmission, a telephone instrument coupled to the telephone line for voice transmission, an off hook telephone sensing device coupled to the telephone instrument for detecting the on-hook or off-hook condition of the instrument and for providing an output signal having values in accordance with the on-hook or off-hook condition of the instrument, a switching means coupled to the telephone instrument and to the telephone line for connecting or disconnecting the telephone instrument to or from the telephone line, the transaction terminal including means coupled to the off-hook sensing device and responsive to the output signal for producing an interrupt signal when the off-hook sensing device detects the off-hook condition of the telephone instrument and with the telephone instrument disconnected from the telephone line, and the transaction terminal including means coupled to the switching means and responsive to the interrupt signal for controlling the switching means to connect the telephone instrument to the telephone line after the reception of the interrupt signal and after the termination by the transaction terminal of the data transmission.

6 Claims, 4 Drawing Figures

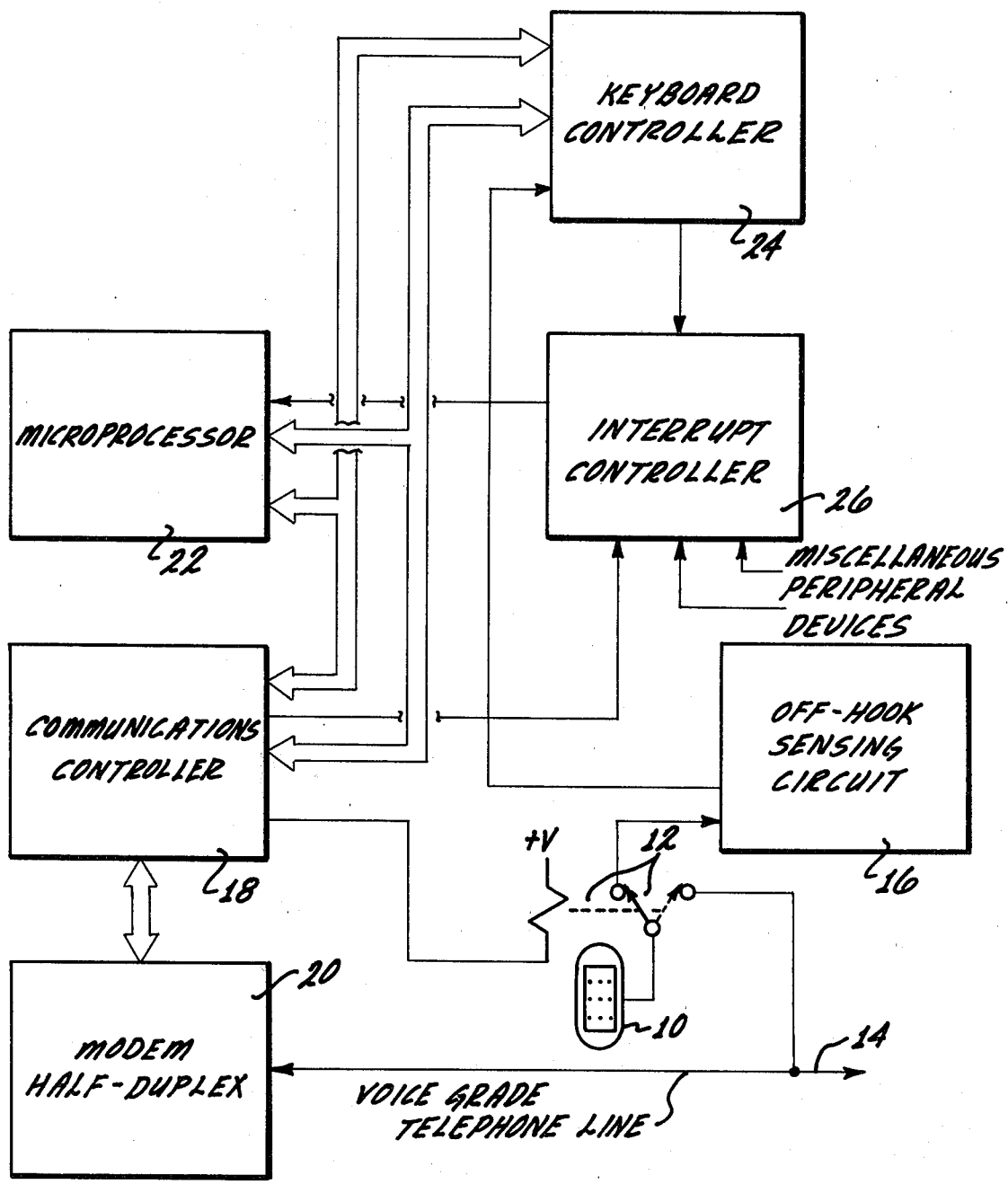

OFF-HOOK TELEPHONE SENSING SYSTEM

The present invention is directed to an off-hook telephone sensing device for use with a voice and data transmission system. In particular the present invention is directed to an apparatus and method to automatically detect an off-hook condition of a telephone handset for the purpose of multiplexing the use of a single telephone line between a voice made and a data transmission mode. The apparatus and method of the present invention may be used as part of a transaction terminal such as a financial transaction terminal.

Transaction terminals are being increasingly used to provide for the transmission of data between a local position and a central position. For example, an individual can have such a transaction terminal in his home or place of business and use the terminal to provide for financial transactions with a central terminal which may, for example, be located in a bank. The data transmission is accomplished using an ordinary voice grade telephone line and with the transaction terminal coupled to the same telephone line as a telephone handset.

It would be desirable to be able to automatically switch between the data transmission mode and the voice transmission mode by merely picking up the telephone handset as a request for a voice mode of use, and with the terminal automatically detecting the off-hook telephone condition to provide for a switching to the voice mode at an appropriate time. For example, after the data transmission has been accomplished the terminal may automatically switch to the voice mode, assuming there has been a detection of an off-hook telephone condition, so that the individual can now use the telephone in a normal way. The overall strategy for when the system allows for the voice mode after an off-hook detection would be controlled by a microprocessor which is part of the transaction terminal.

The apparatus and method of the present invention would include a closed loop system using the normal microcomputer components of the transaction terminal, and with an additional voltage sensing circuit and a relay so as to provide for the detection and control of the telephone instrument being automatically coupled to the telephone line after the detection of the off-hook condition. Specifically, a telephone instrument has a change in impedance when the handset is lifted from its cradle or in a folding type of instrument when the instrument is opened for normal voice use. The impedance of the instrument may be monitored even when the transaction terminal has disconnected the instrument from the telephone line while the terminal is providing for data transmission.

If the handset is taken off hook, as a request for normal voice use, the off-hook sensing circuit senses this change in impedance as a voltage change and provides an output signal representing the request to use the telephone in the voice mode. The microprocessor, in accordance with its program strategy, provides for a control signal to activate a relay to switch the telephone instrument to the telephone line, either when the data transmission has ended or provides for the data transmission to be permanently or temporarily terminated. The individual now hears a normal dial tone and may then use the telephone in a normal manner. After the individual finishes with the voice mode transmission and the telephone is returned to an on-hook condition, the apparatus and method of the present invention provides for the system to be returned to the data transmission mode if this is desirable.

A clearer understanding of the present invention will be had with reference to the following description and drawings wherein:

FIG. 1 illustrates a block diagram of the automatic off-hook sensing system of the present invention;

FIG. 2 illustrates a specific off-hook sensing circuit which may be used with the system of FIG. 1 or FIG. 1a.

Figure 1A:
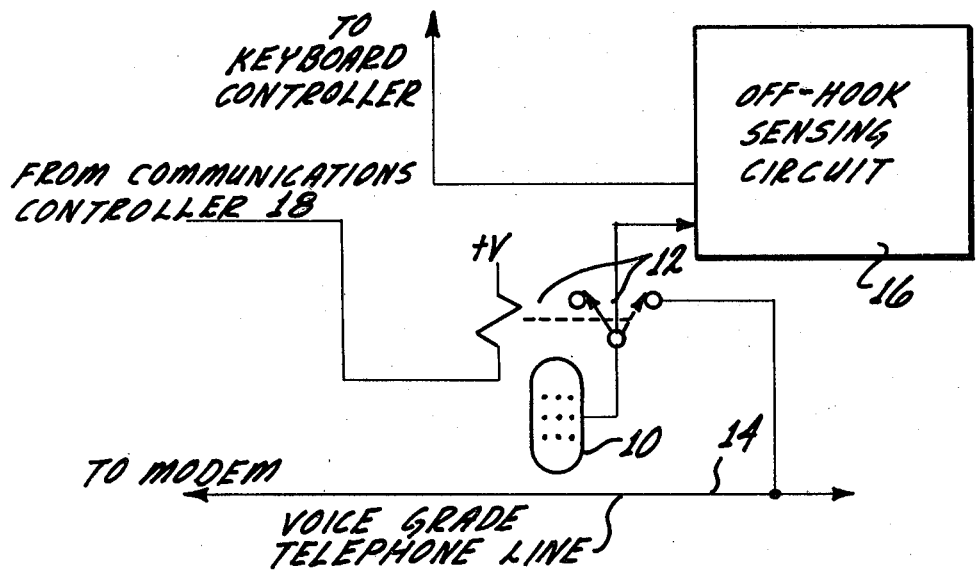
FIG. 1a illustrates a portion of the system of FIG. 1 for providing for an alternative construction and operation of the automatic off-hook sensing system of the present invention.

As shown in FIG. 1 the automatic off-hook sensing system works to sense the on-hook or off-hook condition of a telephone instrument 10. The instrument 10 is coupled through a relay 12 to either a voice grade telephone line 14 or to an off-hook sensing circuit 16. The dotted line position for the relay represents the coupling to the telephone line 14 and the solid line position for the relay represents the coupling to the off-hook sensing circuit 16. The position of the relay 12 is controlled by a control signal from a communications controller 18 and with the switch portion of the relay 12 under direct control in accordance with the control signal from the communications controller 18.

The communications controller 18 receives and transmits data signals from and to a half-duplex modem 20. The modem 20 is connected to the telephone line 14 to provide for the transmission and reception of data to and from the voice grade telephone line 14. The modem 20 therefore interfaces the data transmission on the telephone line 14 with the communications controller 18.

The communications controller is also innerconnected with a microprocessor (CPU) 22 and a keyboard controller 24. The communications controller, microprocessor and keyboard controller are therefore all innerconnected to therefore provide for the transmission and reception of data and for the control and manipulation of that data under an overall strategy as preprogrammed in the microprocessor. This portion of the system is designed in accordance with conventional programming techniques.

An interrupt controller 26 is also innerconnected with the communications controller 18, the microprocessor 22 and the keyboard controller 24. Specifically, the interrupt controller receives signals from the keyboard controller and the communications controller as well as from miscellaneous peripheral devices, and provides for an output signal to the microprocessor 22.

In general, if no power is applied to the terminal system shown in FIG. 1, the relay 12 relaxes to the dotted line switch position to provide for the telephone instrument 10 being normally operative in association with the telephone line 14. When power is applied to the terminal, the microprocessor 22 provides for a command to the communications controller 18 so that the relay 12 is commanded to the solid line switch position wherein the telephone instrument 10 is disconnected from the telephone line 14 and connected to the off-hook sensing circuit 16. The transaction terminal may now provide for data communications along the telephone line 14. This is generally called a data mode of operation and with communication established with a remote central computer. The modem 20 provides for an automatic dialing of the central computer and the telephone instrument 10 is bypassed in the data mode.

During the time that power is applied to the transaction terminal, an individual may desire to use the telephone in a normal voice mode. This may occur when the terminal is in an active data mode or in an inactive data mode. With the present invention the telephone may be opened or lifted from its cradle to change the status of the telephone from on hook to off hook. The impedance of the telephone 10 changes with the change in status and specifically there is a resistance change when the telephone goes from on hook to off hook. This resistance change is detected by the off-hook sensing circuit 16 which in turn provides an output signal to the keyboard controller 24. The output signal indicates that the telephone 10 is now in an off-hook condition and represents a request by the individual for the voice mode of operation.

After receiving the output signal from the circuit 16, the keyboard controller 24 generates a signal to the interrupt controller 26 which in turn provides for an interrupt signal to the microprocessor 22. The microprocessor 22 is programmed to momentarily stop its current state of processing to respond to the interrupt signal from the interrupt controller 26. If the terminal is not in an active data transmission state, the microprocessor 22 may then command the communications controller 18 to deactivate the relay 12 so that the telephone instrument 10 is reconnected to the telephone line 14. The individual may now communicate by voice with an operator at the central terminal. Such voice communication is over the same telephone connection established for data communication.

If the terminal is in an active data transmission state, the microprocessor 22 may return to the data processing and provide for a continuation of this data processing until an appropriate time is reached to interrupt the processing or to wait until the processing is finished. This would depend on the program strategy programmed into the microprocessor 22. At the appropriate time the data mode is then terminated and the microprocessor commands the communication controller 18 to deactivate the relay 12 so that the telephone instrument 10 is reconnected to the telephone line 14.

The system shown in FIG. 1 may be returned to the data mode after the individual finishes with the voice mode operation. The data mode may be activated manually from the keyboard controller 24 so that as soon as the individual finishes with the voice mode operation he may then manually return to the data mode. At this time, the relay 12 is actuated to provide for the switch in the solid line position. Alternatively, the telephone line 14 may be monitored through the modem 20, and when the individuals finish the voice mode operation, a tone signal from the central computer or the absence of voice signals on the telephone line 14 may be used to provide for a signal from the communications controller 18 to actuate the relay 12 to the solid line position.

FIG. 1a shows an alternate way of automatically switching to and from the voice and data modes wherein the impedance of the telephone 10 is always monitored by the off-hook sensing circuit 16. In the embodiment of FIG. 1a, when there is no power applied to the terminal, the relay 12 relaxes to the dotted line switch position. When power is applied, the relay 12 is controlled to the solid line switch position with the telephone instrument 10 disconnected from the voice grade telephone line 14. Data communication may now occur on the telephone line 14 as before.

When an individual requests the voice mode, the telephone instrument is taken from its cradle or opened to thereby provide for a change in resistance. The resistance change is detected by the off-hook sensing circuit 16 and as before a signal may be provided so that the relay is actuated to the dotted line switch position at an appropriate time to allow for the voice mode operation. When the individual is finished with the voice transmission and the instrument is returned to its cradle or closed, the change in resistance is again detected by the off-hook sensing circuit 16 to provide for a control signal to control the relay 12 to return to the solid line switch position. The embodiment of FIG. 1a therefore provides for a simple, automatic method of controlling the data or voice modes of operation by having the telephone instrument 10 constantly monitored by the off-hook sensing circuit.

Figure 2:
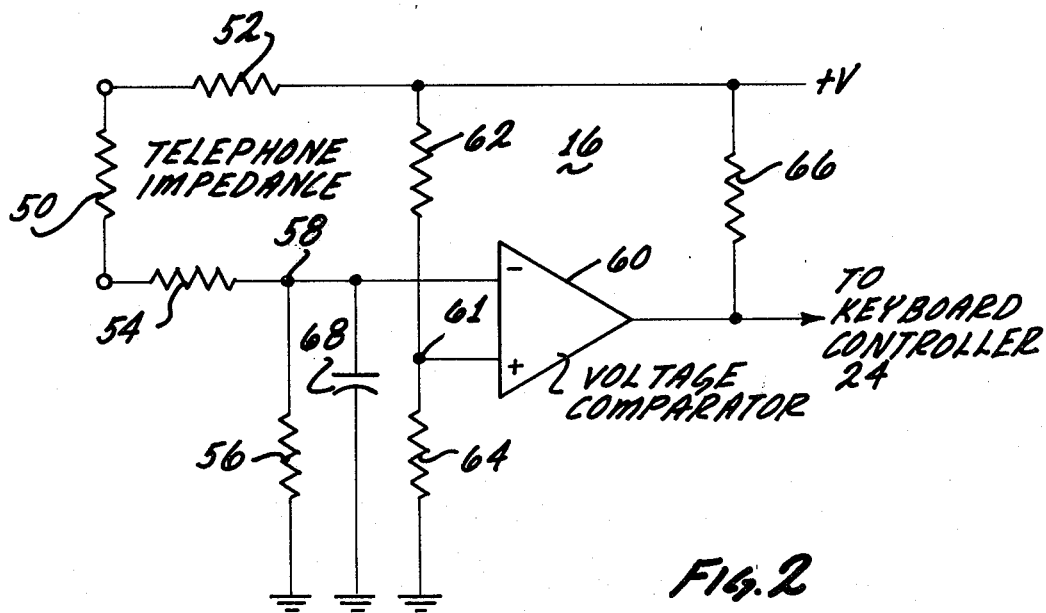

FIG. 2 illustrates a specific circuit for providing for the off-hook sensing circuit 16. In FIG. 2, the impedance of the telephone instrument 10 is represented by the variable resistor 50. Specifically, the resistance of the instrument 10 changes in accordance with the instrument being in the on-hook or off-hook state. The variable resistor 50 is in series with a pair of resistors 52 and 54. The resistors 50, 52 and 54, in association with a resistor 56, form a voltage divider circuit between a source of positive voltage and ground. Specifically, the voltage at a junction 58 is representative of the value of the resistance 50 of the telephone instrument 10. The voltage at the junction 58 is coupled to one input of a voltage comparator 60. The second input of the voltage comparator 60 is provided by the voltage of a junction 61, which is a constant voltage. The constant voltage is produced by a voltage divider formed by the resistors 62 and 64 extending between the source of positive voltage and ground. An output resistor 66 is coupled between the source of positive voltage and the output of the voltage comparator 60. A capacitor 68 filters out any high frequency noise signals.

The voltage comparator 60 creates a binary output state representative of the relative magnitudes of the voltages at the two input terminals to the voltage comparator 60. Specifically, the output from the voltage comparator 60 may be zero (0) volts if the voltage at the negative terminal is greater than the voltage at the positive terminal. Likewise, the output from the voltage comparator 60 may be a positive voltage such as five (5) volts if the voltage at the positive terminal is greater than the voltage at the negative terminal. Since the positive terminal receives a constant reference voltage, a change in the voltage at the negative terminal above or below this constant reference voltage causes a change in the state of the output from the voltage comparator 60.

Since a change in the resistance 50 of the telephone instrument 10 results from the telephone instrument being moved between the on-hook and the off-hook state, the change in the on- or off-hook state of the telephone instrument provides for a change in voltage at the negative terminal of the voltage comparator 60. Therefore, the voltage comparator 60 provides for a binary output state having either zero (0) volts or a positive voltage such as five (5) volts representing the particular on- or off-hook state for the telephone instrument. The voltage comparator 60 therefore provides for the output signal to the keyboard controller 24 in accordance with the on- or off-hook state of the telephone instrument 10.

In the system shown in FIG. 1, the variable telephone resistance 50 would be removed from the circuit by actuation of the relay 12 so that there would be no voltage applied to the voltage comparator 60 at the negative terminal. This would not change the output signal from the voltage comparator 60 since the voltage at the positive terminal would remain larger than the voltage at the negative terminal. In the system of FIG. 1a the variable telephone resistor 50 is always in the circuit to provide for an automatic change in state of the signal from the voltage comparator 60 depending upon whether the telephone instrument 10 is in an on-hook or off-hook condition.

Figure 3:
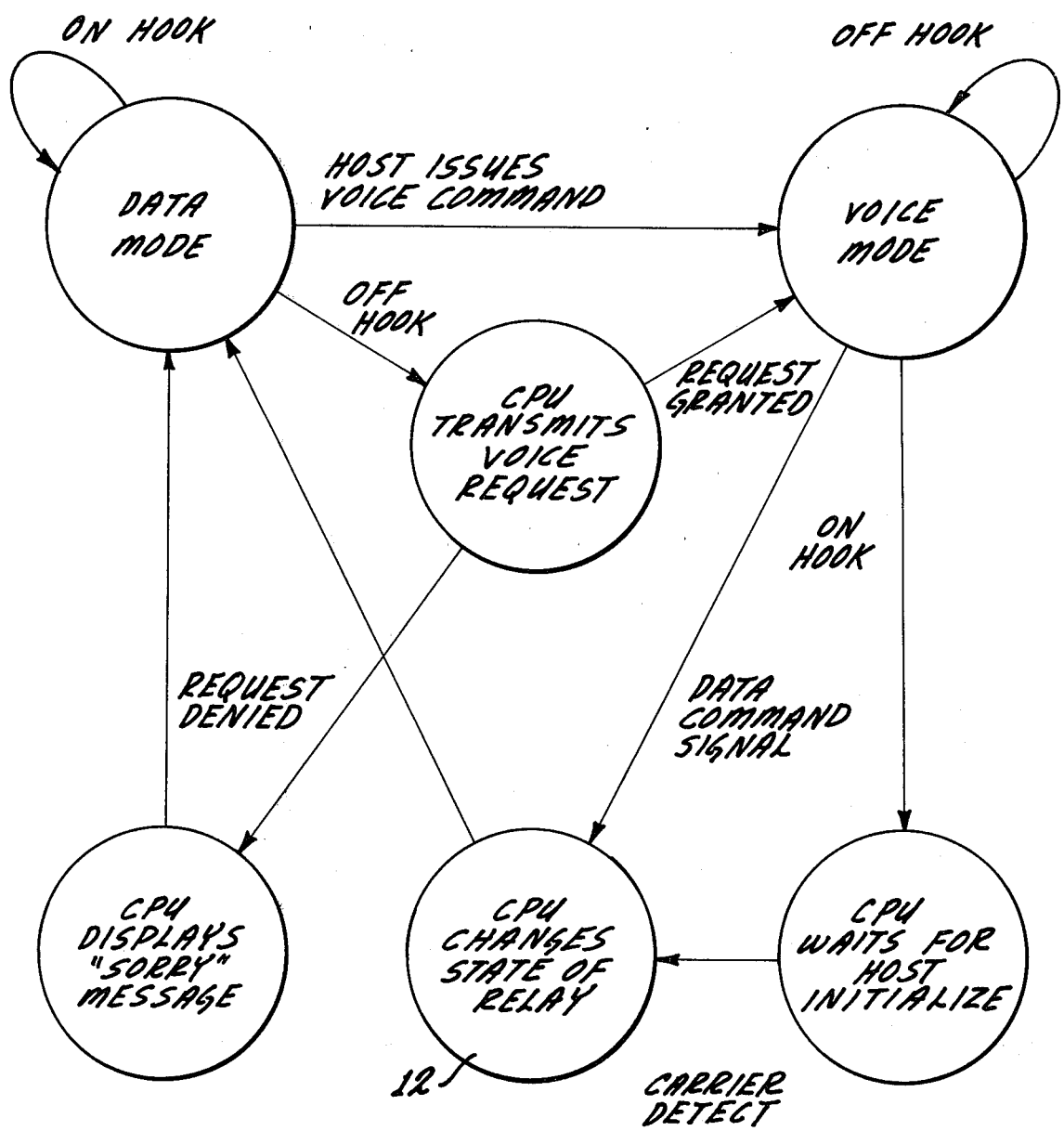
FIG. 3 is a flow chart illustrating a control strategy for the system of the present invention.

FIG. 3 illustrates a particular control strategy which may be used with the automatic off-hook sensing system of the present invention. As can be seen in FIG. 3, the system may be either in the data mode or the voice mode and with the telephone instrument being on hook or off hook. Normally when in the data mode the telephone instrument is on hook and the data transmission occurs in a normal way. At that point, the microprocessor (CPU) 22 shown in FIG. 3 provides for the communications controller 18 maintaining the relay 12 in the solid line switch position. If the telephone instrument is taken off hook while in the data mode, the CPU may control the terminal to deny the request for the voice mode until the data transmission is completed or until an appropriate time to interrupt the data transmission. Before switch to the voice mode, a message may be displayed that the request is being denied temporarily. At the appropriate time, the request to switch to the voice mode is granted and the state of the relay 12 is changed so that the telephone instrument 10 is connected to the telephone line 14. This would be represented by the off-hook voice mode of operation of the system.

It is to be appreciated that the particular control strategy may be modified in accordance with the desired operation for the terminal but in general the present invention provides for the automatic off-hook sensing and then an automatic switching from a data to a voice mode when the telephone instrument is taken off hook by an individual who desires to use the telephone in the normal voice mode.

Although the present invention has been described with reference to particular embodiments, it is to be appreciated that various adaptations and modifications may be made and the invention is only to be limited by the appended claims.

I claim:

1. An off-hook telephone sensing system for use with a voice and data transmission system wherein the system includes a transaction terminal coupled to a telephone line for data transmission and a standard telephone instrument coupled to the telephone line for voice transmission, including
an off-hook telephone sensing device coupled to the standard telephone instrument for detecting the on-hook or off-hook condition of the instrument and for providing an output signal having values in accordance with the on-hook or off-hook condition of the instrument, and wherein the off-hook sensing device includes a voltage comparator having a reference voltage input and a variable voltage input and with a change in impedance of the standard telephone instrument between the on-hook and off-hook conditions controlling the value of the variable voltage input and with the voltage comparator providing the output signal in accordance with the change in impedance of the telephone instrument, and wherein the impedance of the telephone instrument forms part of a voltage divider circuit and with the change in impedance of the telephone instrument providing the variable voltage input to the voltage comparator,
a switching means having first and second states coupled to the telephone instrument and to the telephone line and with the telephone instrument connected to the telephone line with the switching means in the first state and with the telephone instrument disconnected from the telephone line with the switching means in the second state,
means coupled to the off-hook sensing device and responsive to the output signal for producing an interrupt signal when the off-hook sensing device detects the off-hook condition of the telephone instrument and with the switching means in the second state, and
means coupled to the switching means and responsive to the interrupt signal for controlling the switching means from the second state to the first state after the reception of the interrupt signal.

2. The off-hook sensing system of claim 1 wherein the off-hook sensing device is coupled to the telephone instrument only when the switching means is in the second state to have the on-hook or off-hook condition of the telephone instrument monitored only when the transmission system provides data transmission.

3. The off-hook sensing system of claim 1 wherein the off-hook sensing device is coupled to the telephone instrument when the switching means is in both the first and second states to have the on-hook or off-hook condition of the telephone instrument always monitored.

4. An off-hook telephone sensing system for use with a voice and data transmission system, including
a transaction terminal coupled to a telephone line for data transmission,
a standard telephone instrument coupled to the telephone line for voice transmission,
a off-hook telephone sensing device coupled to the standard telephone instrument for detecting the on-hook or off-hook condition of the instrument for providing an output signal having values in accordance with the on-hook or off-hook condition of the instrument, and wherein the off-hook sensing device includes a voltage comparator having a reference voltage input and a variable voltage input and with a change in impedance of the standard telephone instrument between the on-hook and off-hook conditions controlling the value of the variable voltage input and with the voltage comparator providing the output signal in accordance with the change in impedance of the telephone instrument and wherein the impedance of the telephone instrument forms part of a voltage divider circuit and with the change in impedance of the telephone instrument providing the variable voltage input to the voltage comparator,
a switching means coupled to the telephone instrument and to the telephone line for connecting or disconnecting the telephone instrument to or from the telephone line, the transaction terminal including means coupled to the off-hook sensing device and responsive to the output signal for producing an interrupt signal when the off-hook sensing device detects the off-hook condition of the telephone instrument and with the telephone instrument disconnected from the telephone line, and the transaction terminal including means coupled to the switching means and responsive to the interrupt signal for controlling the switching means to connect the telephone instrument to the telephone line after the reception of the interrupt signal and after the termination by the transaction terminal of the data transmission.

5. The off-hook sensing system of claim 4 wherein the off-hook sensing device is coupled to the telephone instrument only when the switching means disconnects the telephone instrument from the telephone line to have the on-hook or off-hook condition of the telephone instrument monitored only when the transmission system provides data transmission.

6. The off-hook sensing system of claim 4 wherein the off-hook sensing device is coupled to the telephone instrument when the switching means connects or disconnects the telephone instrument to or from the telephone line to have the on-hook or off-hook condition of the telephone instrument always monitored.

* * * * *